INVENTORS
HANS MENELL
GÜNTER JOHANNES

United States Patent Office 3,467,161
Patented Sept. 16, 1969

3,467,161
PNEUMATIC TIRE
Hans Menell, Ahlem uber Hannover, and Gunter Johannes, Hannover-Herrenhausen, Germany, assignors to Continental Gummi-Werke Aktiengesellschaft, Hannover, Germany
Filed Jan. 19, 1967, Ser. No. 610,336
Claims priority, application Germany, Jan. 19, 1966, C 37,948
Int. Cl. B60c 5/08, 9/06, 13/00
U.S. Cl. 152—354                                10 Claims

ABSTRACT OF THE DISCLOSURE

The invention concerns a belted tire in which the belt is formed by superimposed layers of strength carriers, said strength carriers crossing each other while respectively forming different angles with the circumferential direction of the tire. One layer of said layers of strength carriers pertain to the carcass and is anchored at the tire beads.

The present invention relates to a pneumatic tire with a reinforcing insert extending substantially over the width of the tread strip and located within the area of the tread strip while comprising superimposed layers with parallel strength carriers crossing each other, said strength carriers being formed of cords, wires, bands, or the like.

With heretofore known pneumatic tires of this type equipped with a belt-shaped reinforcing insert of strength carriers crossing each other, it is necessary that the tire understructure and the reinforcing insert be manufactured separately from each other and with different diameters. In this connection, the tire understructure is built up in conformity with the flat band method as a practically hollow cylinder, whereas the reinforcing insert will from the start obtain a diameter which corresponds approximately to the finished diameter. This method of manufacture and the subsequent unification of the two above mentioned units requires special devices of production.

It is, therefore, an object of the present invention so to improve pneumatic tires of the above mentioned type that they will have a low rolling resistance, a good lateral stability and high dynamic softness.

It is another object of this invention so to improve pneumatic tires of the above mentioned type that they can be produced according to the flat band method in such a way that the reinforcing insert together with the tire understructure can be built up on a cylindrical or nearly cylindrical drum.

These and other objects and advantages of the invention will appear more clearly from the following specification in connection with the accompanying drawings, in which.

Figure 3:
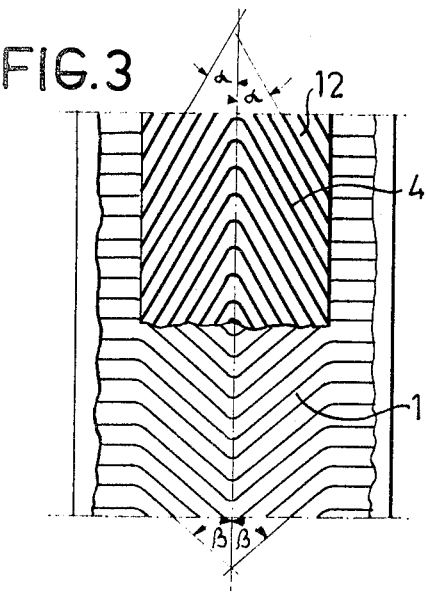
Figure 4:
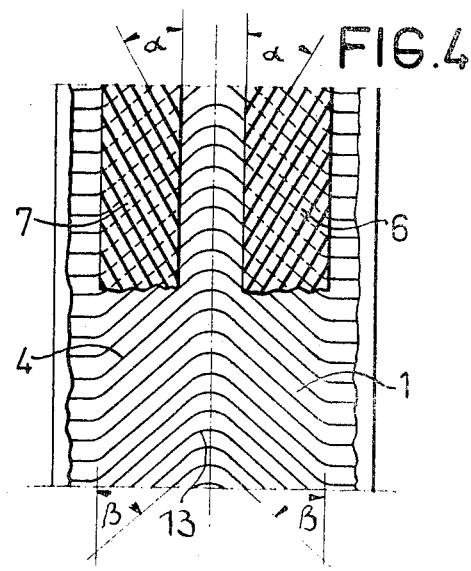

FIGS. 3 and 4 respectively diagrammatically illustrate partial top views of pneumatic vehicle tires with modified arrangements of the strength carriers.

Figure 1:
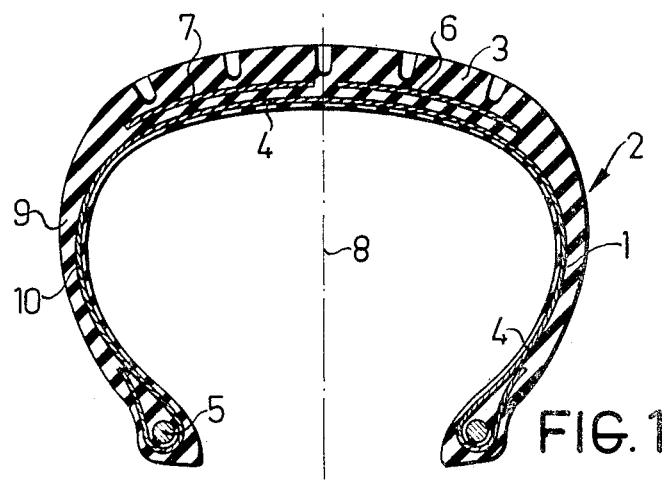
FIG. 1 is a partial section through a pneumatic vehicle tire according to the present invention.
Figure 5:
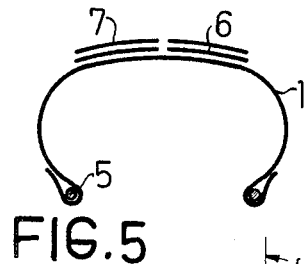
Figure 6:
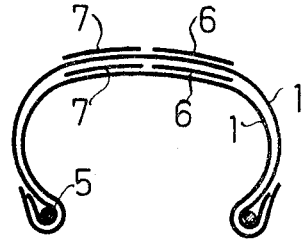

FIGS. 5 and 6 diagrammatically represent partial cross sections corresponding to that of FIG. 1.

Figure 7:
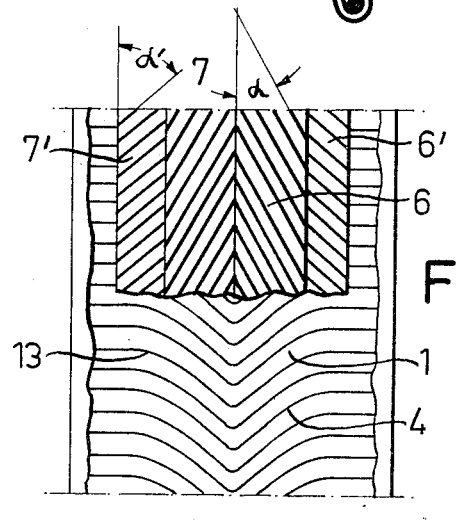

FIG. 7 shows a further modification of the arrangement of the strength carriers and is a partial top view of a pneumatic vehicle tire according to the present invention.

In conformity with the present invention, the strength carriers have their layers extending in V-shaped manner so arranged that the tip of the V points in the circumferential direction while the opening angle of the V, at least with one layer, is greater than with the other layer or layers. Advantageously, those strength carriers which form the V with the greater opening angle form one piece with the strength carriers passing through the side walls of the tire and anchored in the beads so that the said strength carriers extend at a right angle or practically a right angle with regard to the circumferential direction of the tire. For purposes of realizing the present invention, advantageously layers are employed which comprise two cord fabric strips which, seen in the transverse direction of the tire, are located alongside each other, while the strength carriers of one cord fabric strip extend in one slant direction and the strength carriers of the adjacent cord fabric strip extend in another slant direction.

Referring now to the drawings in detail, the carcass 1 of the tire body 2 equipped with tread strip 3 and consisting of rubber or rubber-like material comprises pull-resistant threads 4 which are parallel to each other and which in an uninterrupted manner extend from bead to bead where they are connected to the bead cores 5 by being looped therearound. Between the tire tread strip 3 and the carcass 1 there are provided two cord fabric strips 6 and 7 which abut each other approximately along the central circumferential plane of the tire and which are approximately parallel to the carcass 1. The said strips 6 and 7 together extend substantially over the width of the tread strip 3. Strips 6 and 7 are likewise formed by parallel strength carriers or pull-resistant cord threads 4.

The cord threads 4 of strips 6, 7 together with the circumferential direction of the tire form an angle $\alpha$ of from 3 to 30° in such a way that the strength carriers 4 of strip 6 point in one slant direction, whereas the strength carriers of the cord fabric strip 7 point in the other slant direction. Thus, the cord threads 4 of the cord fabric strips 6, 7 together define a V which is symmetric or the arms of which are symmetric with regard to the tire center line 8 while the tip of the V in the drawing points upwardly.

Below the cord fabric strips 6 and 7, the strength carriers 4 of carcass 1 likewise define a V with each other. However, in this instance, the tip of the V points in the opposite direction which means downwardly with regard to the drawing. These strength carriers 4 of carcass 1 together with the circumferential direction of the tire form an angle $\beta$ of from 10 to 50°. Preferably, however, this angle $\beta$ is so great that it exceeds the angle $\alpha$ for the strength carriers 4 of the cord fabric strips 6 and 7.

Below the laterally outwardly located marginal portions of the cord fabric strips 6 and 7, the strength carriers 4 of carcass 1 are angled off or bent, and from here the sections 10 of the strength carriers 4 passing through the tire side walls 9 extend at a right angle or nearly at a right angle with regard to the circumferential direction of the tire.

Figure 2:
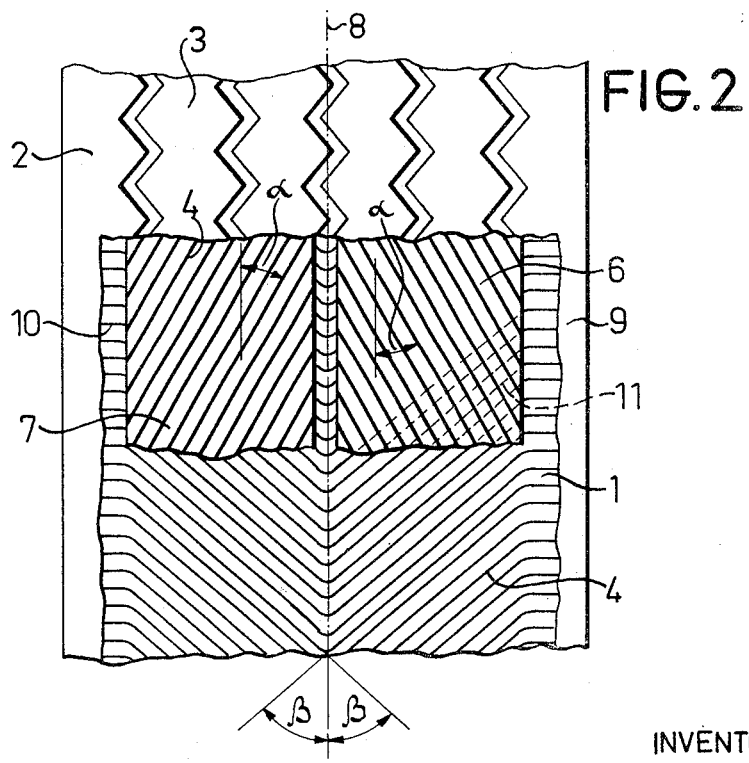
FIG. 2 is a partial top view of the tire of FIG. 1 with emphasis on the strength carriers.

As will be seen from FIG. 2 at 11, within the tread strip zone there is formed a cross connection which forms the belt-like reinforcing insert for the tire. This reinforcing insert brings about the lateral stabilization of the tire and is stiff in the circumferential direction and lateral direction while assuring a low rolling resistance.

When producing the raw tire according to the flat band method, the strength carriers 4 of carcass 1 extend from bead to bead in the direction of the sections 10, i.e. in the axial direction of the tire building drum, and also below the cord fabric strips 6 and 7 on said drum. During the curving operation, the angle $\alpha$ decreases, and the V-shape of the strength carriers 4 is obtained so that these strength carriers form the angles $\beta$ when the tire is curved and vulcanized. In this way it is possible to produce a belted tire according to the flat band method with a belt formed by threads or the like which cross each other.

According to FIG. 3, the strength carriers 4 are bent in a V-shaped manner. The strip 12 formed by said strength carriers 4 and adapted to replace the two cord fabric strips 6 and 7 has a width extending from shoulder to shoulder of the tire. Also in this instance, the one piece cord threads 4 extend under the angle α.

According to FIG. 4, the cord fabric strips 6 and 7 are not arranged so as to butt against each other, but are arranged so as to be spaced from each other. In contrast to FIG. 2, the cord threads 4 of carcass 1 are located between the two cord fabric strips 6 and 7 with a greater bending radius. The cord threads 4 of carcass 1 thus, within the area of the cord fabric strips 6 and 7, define a V with round tip. Such construction is particularly advisable when for the strength carriers 4 a material is employed which does not permit small bending radii.

The illustrated tire designs can be realized with a one layer carcass and a one layer reinforcement below the tread strip 3. However, it is also possible according to FIG. 5, above a one layer carcass 1 to effect a doubling of the cord fabric strips 6 and 7.

As shown in FIG. 6, it is furthermore possible with a double layer carcass 1 to arrange cord fabric strips 6 and 7 between the strength carriers 4 of carcass 1. In this connection it is important that all cord threads 4 of the superimposed cord fabric strips 6 and 7 in one slant direction extend practically parallel to each other, whereas all superimposed thread sections of carcass 1 are likewise arranged at the same angle or form the same angle with the circumferential direction of the tire so that in top view a thread course is obtained which looks like the one of FIGS. 2 to 4.

In order to bring about a greater radius of curvature of the strength carriers 4 of carcass 1 below the marginal zones of the tread zone reinforcement, according to FIG. 7, at both sides of the cord fabric strips 6 and 7 there is respectively arranged a further cord fabric strip 7' and 8'. However, the angle α' is from 10 to 20° greater than the angle α of the cord fabric strips 6 and 7. The thus during the curving operation obtained greater radius of curvature of the strength carriers 4 of carcass 1 is illustrated at 13.

As will be evident from the above, a tire structure according to the present invention has the advantage that, when building up a raw tire according to the flat band method, it permits the start of the manufacturing process with cord fabric strips with strength carriers extending in the axial direction of the drum and to associate with these strength carriers strength carriers in V-shape formation or the above mentioned adjacent cord fabric strips. By curving a thus built up tire, the strength carriers extending in the axial direction will be deformed so as to form a V. In this connection, diameter changes are possible to such an extent that the pneumatic raw tire with all its elements can be built up as a hollow cylindrical or approximately hollow cylindrical body, and the curving operation can subsequently be carried out with all elements of the raw tire. The finished tire will then have strength carriers in V-shape formation while the tips of the V respectively point in opposite direction in circumferential direction of the tire. This formation of a belt with the elements forming a herringbone pattern brings about a cross connection which will assure a strong belt which is pull-resistant in circumferential direction and is sufficiently strong to absorb lateral forces.

What we claim is:

1. A pneumatic vehicle tire having a tread strip, a carcass comprising lateral walls and beads and also comprising first reinforcing strength carrier means extending from bead to bead through said side walls and having portions located radially inside said tread strip, which includes: second strength carrier means interposed between said first strength carrier means and said tread strip and located between the lateral wall portions of said tire, said first and second strength carrier means having their superimposed portions extend at an angle with regard to the circumferential direction of said tire so that those portions of said first strength carrier means which are radially and laterally inside of said tread strip and are part of a first layer form a V having its tip pointing in a first direction, whereas those portions of said second strength carrier means which are part of a second layer form a V having its tip pointing in a second direction opposite to said first direction, the opening angle defined by the V of said first strength carrier means being different from the opening of said V of said second strength carrier means.

2. A pneumatic vehicle tire having a tread strip, a carcass comprising lateral walls and beads and also comprising first reinforcing strength carrier means extending from bead to bead through said lateral walls and being located radially inside said tread strip, which includes: second strength carrier means interposed between said first strength carrier means and said tread strip and located between the lateral wall portions of said tire, said first and second strength carrier means having their superimposed portions extend at an angle with regard to the circumferential plane of symmetry of said tire, those portions of said second strength carrier means which are located at a first layer but on opposite sides of said plane of symmetry respectively form an image to each other while with each other defining a V having its tip located substantially in said plane of symmetry and pointing in a first direction and those portions of said first strength carrier means which are respectively located radially inside said second strength carrier means at a second layer and between said lateral side walls likewise forming an image to each other while respectively defining with each other a V having its tip located in said plane of symmetry and pointing in a second direction opposite to said first direction, the opening angle defined by the V of said first strength carrier means being different from the opening angle of the V of said second strength carrier means.

3. A vehicle tire according to claim 1, in which those portions of said first strength carrier means which are located inwardly of said second strength carrier means form the V with the greater opening angle, and in which those portions of said first strength carrier means which are located in said lateral walls extend for all practical purposes at a right angle with regard to the circumferential direction of the tire.

4. A vehicle tire according to claim 1, in which those strength carrier means which form the V with the smaller opening angle form an angle of from 3 to 30° with the circumferential direction of the tire, whereas those strength carrier means which form the V with the larger opening angle form an angle of from 10 to 50° with the circumferential direction of the tire, the superimposed portions of said first and second strength carrier means respectively forming different angles with the circumferential direction of said tire.

5. A vehicle tire according to claim 2, in which those strength carrier means which form the V with the smaller opening angle are respectively formed by two cord strips in butting engagement with each other.

6. A vehicle tire according to claim 2, in which those strength carrier means which form the V with the smaller opening angle are respectively formed by two cord strips having their inner edges facing each other in slightly spaced relationship with regard to each other.

7. A vehicle tire according to claim 2, in which those strength carrier means which form the V with the smaller opening angle are formed by a single integral piece.

8. A vehicle tire according to claim 1, in which the strength carrier means which form the V with the smaller opening angle have those portions thereof which face in the direction toward said lateral walls define a larger angle with the circumferential direction of the tire than do those portions of said strength carrier means forming the V with the smaller opening angle which are located within the range of the central circumferential portion of the tire.

9. A vehicle tire according to claim 2, in which the second strength carrier means are formed by a plurality of superimposed layers.

10. A vehicle tire according to claim 2, in which said second strength carrier means are formed by an inner pair of strips respectively located on opposite sides of said plane of symmetry and are additionally formed by a second pair of strips respectively located laterally of the strips of said first pair of strips, the strength carrier portions of said second pair of strips forming a different angle with said plane of symmetry than do the strips of said first pair of strips.

References Cited

UNITED STATES PATENTS 2,930,425  3/1960  Lugli et al. _____ 152—361

FOREIGN PATENTS 1,446,822  6/1966  France.
1,198,691  8/1965  Germany.

ARTHUR L. LA POINT, Primary Examiner

CHARLES B. LYON, Assistant Examiner

U.S. Cl. X.R.

152—361